(12) United States Patent
Allan

(10) Patent No.: US 7,012,432 B2
(45) Date of Patent: Mar. 14, 2006

(54) INDUCTION LOGGING ANTENNA

(75) Inventor: Victor Allan, Dyce (GB)

(73) Assignee: Geolink (UK) Ltd., Aberdeen (GB)

(*) Notice: Subject to any disclaimer, the term of this patent is extended or adjusted under 35 U.S.C. 154(b) by 57 days.

(21) Appl. No.: 10/466,985

(22) PCT Filed: Jan. 23, 2002

(86) PCT No.: PCT/GB02/00303

§ 371 (c)(1),
(2), (4) Date: Jul. 23, 2003

(87) PCT Pub. No.: WO02/059651

PCT Pub. Date: Aug. 1, 2002

(65) Prior Publication Data

US 2004/0075577 A1    Apr. 22, 2004

(30) Foreign Application Priority Data

Jan. 25, 2001   (GB) .................................. 0101919

(51) Int. Cl.
*G01V 3/08* (2006.01)
*G01V 3/10* (2006.01)
*G01V 3/12* (2006.01)
*G01V 3/18* (2006.01)

(52) U.S. Cl. ...................... 324/333; 324/344

(58) Field of Classification Search .......... 324/323, 324/332, 333, 334, 338, 339, 342, 345, 346, 324/344; 73/152.01, 152.02, 152.43, 152.51, 73/152.54
See application file for complete search history.

(56) References Cited

U.S. PATENT DOCUMENTS

| | | | | |
|---|---|---|---|---|
| 4,292,590 A * | 9/1981 | Wilson | ................. | 324/226 |
| 4,461,997 A * | 7/1984 | Ohmer | ................. | 324/338 |
| 4,651,101 A * | 3/1987 | Barber et al. | ............... | 324/339 |
| 4,873,488 A * | 10/1989 | Barber et al. | ............... | 324/339 |
| 5,132,624 A * | 7/1992 | Kitson | ................. | 324/339 |
| 5,467,019 A | 11/1995 | Lester et al. | | |
| 6,100,696 A | 8/2000 | Sinclair | | |
| 6,188,222 B1 * | 2/2001 | Seydoux et al. | ............. | 324/339 |
| 6,489,772 B1 * | 12/2002 | Holladay et al. | ........... | 324/339 |
| 6,509,738 B1 * | 1/2003 | Minerbo et al. | ............ | 324/339 |
| 6,727,827 B1 * | 4/2004 | Edwards et al. | ......... | 340/854.9 |

FOREIGN PATENT DOCUMENTS

| | | |
|---|---|---|
| GB | 2346509 | 8/2000 |
| WO | WO 86/00112 | 1/1986 |

* cited by examiner

*Primary Examiner*—Bot Ledynh
*Assistant Examiner*—Kenneth Whittington
(74) *Attorney, Agent, or Firm*—Madson & Austin

(57) ABSTRACT

An antenna assembly for an induction logging tool for use in a drilling operation. The assembly includes an outer pressure housing, a coil former within the pressure housing, magnetic cores mounted in the housing, a core carrier within the coil former and the pressure housing which carries the magnetic cores, and shock-absorbing mountings on the core carrier for the magnetic cores.

18 Claims, 5 Drawing Sheets

INDUCTION LOGGING ANTENNA

BACKGROUND OF THE INVENTION

This invention relates to an antenna assembly for an induction logging tool.

The invention has been developed primarily, though not exclusively, with a view to provide an improved antenna assembly for an induction logging tool of the general type disclosed in more detail in U.S. Pat. No. 6,100,696 and PCT/GB00/02510. However, the improved antenna assembly of the invention is applicable generally to induction logging tools.

In designing an antenna assembly for an induction logging tool, consideration has to be given to the external environmental conditions which prevail during a typical drilling situation e.g. pressures of up to 20,000 p.s.i., temperatures ranging from −35° C. to +175° C., and shock and vibration to 1000 g. Despite the environmental factors it is important to maintain electrical stability, and in particular self inductance of the tool in order to achieve accurate logging.

Conventional wisdom suggests that it is not possible to employ magnetic material in an induction logging tool, in a drilling environment, and while maintaining electrical stability of the antenna assembly. Typically, antenna instability in an induction logging instrument results in diminished accuracy of the measurement.

In addition, typically antenna instability in an induction logging instrument results in diminished accuracy of the logging measurement. Furthermore, MPP (molypermalloy)-used in logging tools, is a brittle material and is at risk of being damaged in a drilling environment.

The use of magnetic materials in a coil also effectively permits a reduction in antenna dimensions, more particularly the area enclosed by the wound coil. In this case, an effective permeability of between 5–6 (produced by the magnetic core) allows a reduction in coil diameter of around 2.5, for same antenna sensitivity.

BRIEF SUMMARY OF THE INVENTION

The invention seeks to provide an improved antenna assembly which can provide suitable protection of the magnetic core under shock and vibration and axial thermal expansion of supporting materials i.e. to minimise stresses on the magnetic cores. This is an important objective since the permeability of the cores is a complex function which includes the stresses observed by the material, and a change in the permeability of the material results in a change in the self inductance of the antenna. These stresses may arise from several sources e.g. hydrostatic pressure, thermal expansion of supporting structures and shock and vibration.

According to the invention there is provided an antenna assembly for an induction logging tool for use in a drilling operation, said assembly comprising:

an outer pressure housing;

a coil former within the pressure housing;

magnetic cores mounted in the housing;

a core carrier within the coil former and pressure housing and which carries the magnetic cores; and shock-absorbing mountings on the core carrier for the magnetic cores.

Therefore, the invention provides an antenna assembly for an induction logging tool which maintains its electrical integrity despite adverse environmental conditions, and in particular which is resistant to adverse local pressure, temperature and shock loadings.

The configuration of the antenna assembly serves to reduce stresses induced by local environmental conditions and their effect on other significant antenna variables, such as effective antenna aperture/area, and self inductance.

Preferably, the magnetic cores are MPP cores and which, advantageously, undergo special processing prior to final assembly. The purpose of the processes is threefold: to optimise the magnetic coupling between the individual cores (and hence optimise effective permeability), and to relieve post machining stresses, and reduce local stresses on the magnetic core surface when held in compression, maintaining stability. The process involves machining and "lapping" the toroidal cores to maximise the magnetic coupling area between them and produce an accurate surface finish at the interface between the cores, followed by a temperature cycle annealing process to reduce stresses built up during the machining process.

A preferred embodiment of an antenna assembly according to the invention will now be described in detail, by way of example only, with reference to the accompanying drawings, in which:

DETAILED DESCRIPTION OF THE INVENTION

Figure 1:
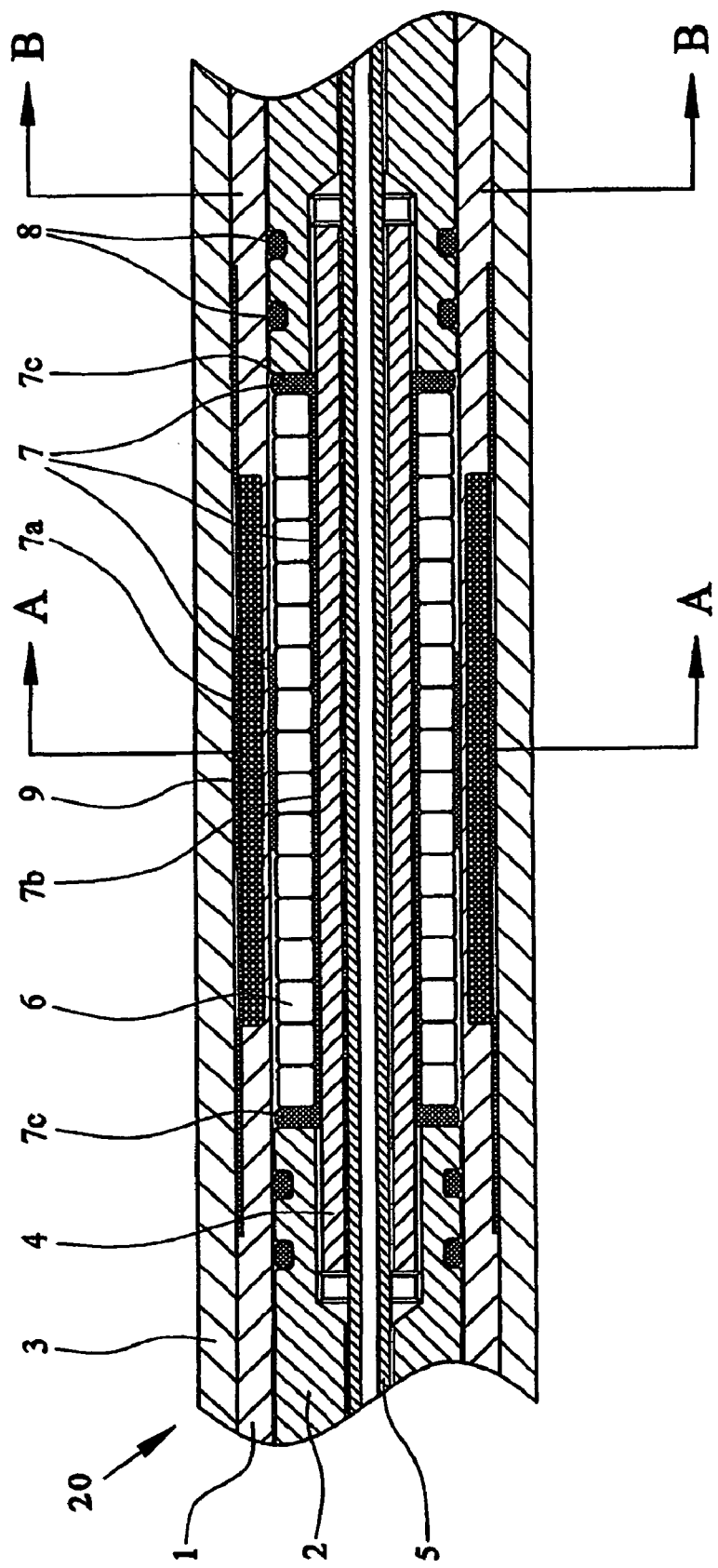
FIG. 1 is a sectional elevation view through the antenna assembly, on a plane indicated by the line C—C on FIG. 4.
Figure 2:
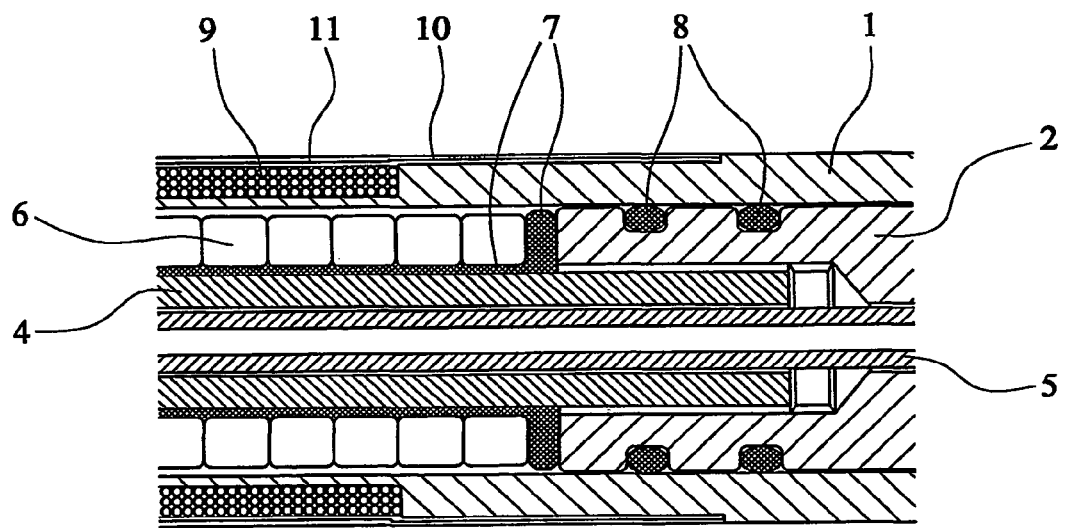
FIG. 2 is a partial sectional elevation view through the antenna assembly on the same plane as FIG. 1.
Figure 3:
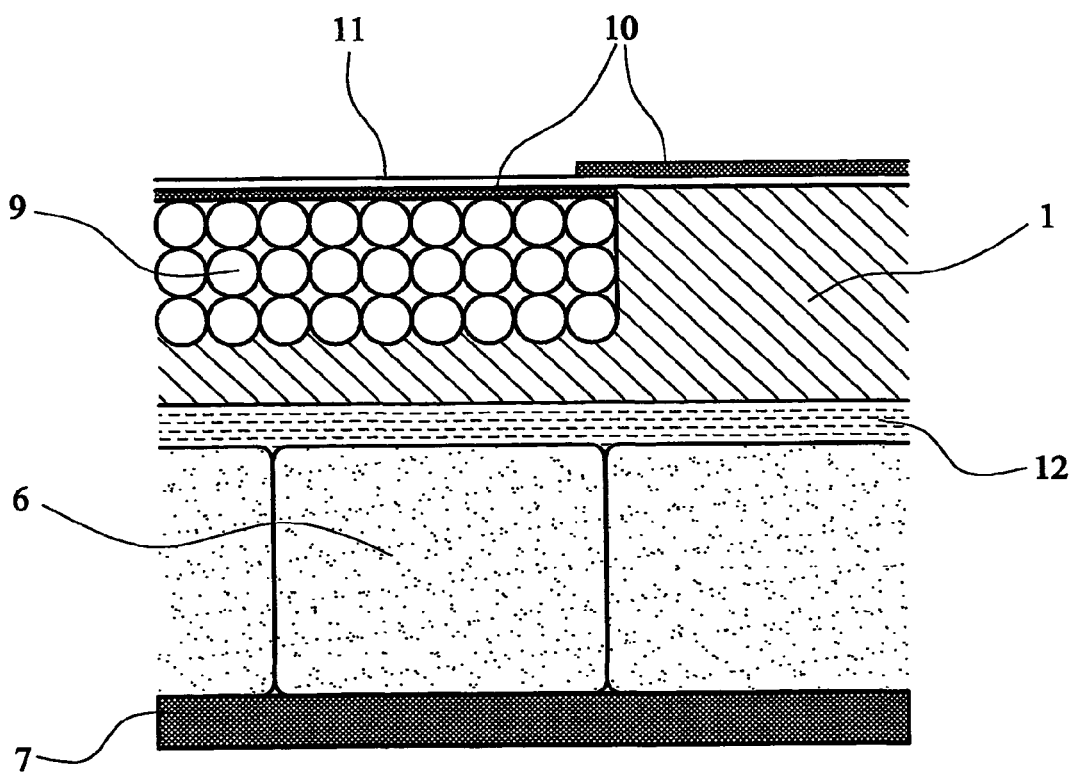
FIG. 3 is again, a partial sectional elevation view, to an enlarged scale, through the antenna assembly on the same plane as FIG. 1, but showing greater detail of some of the component parts.
Figure 4:
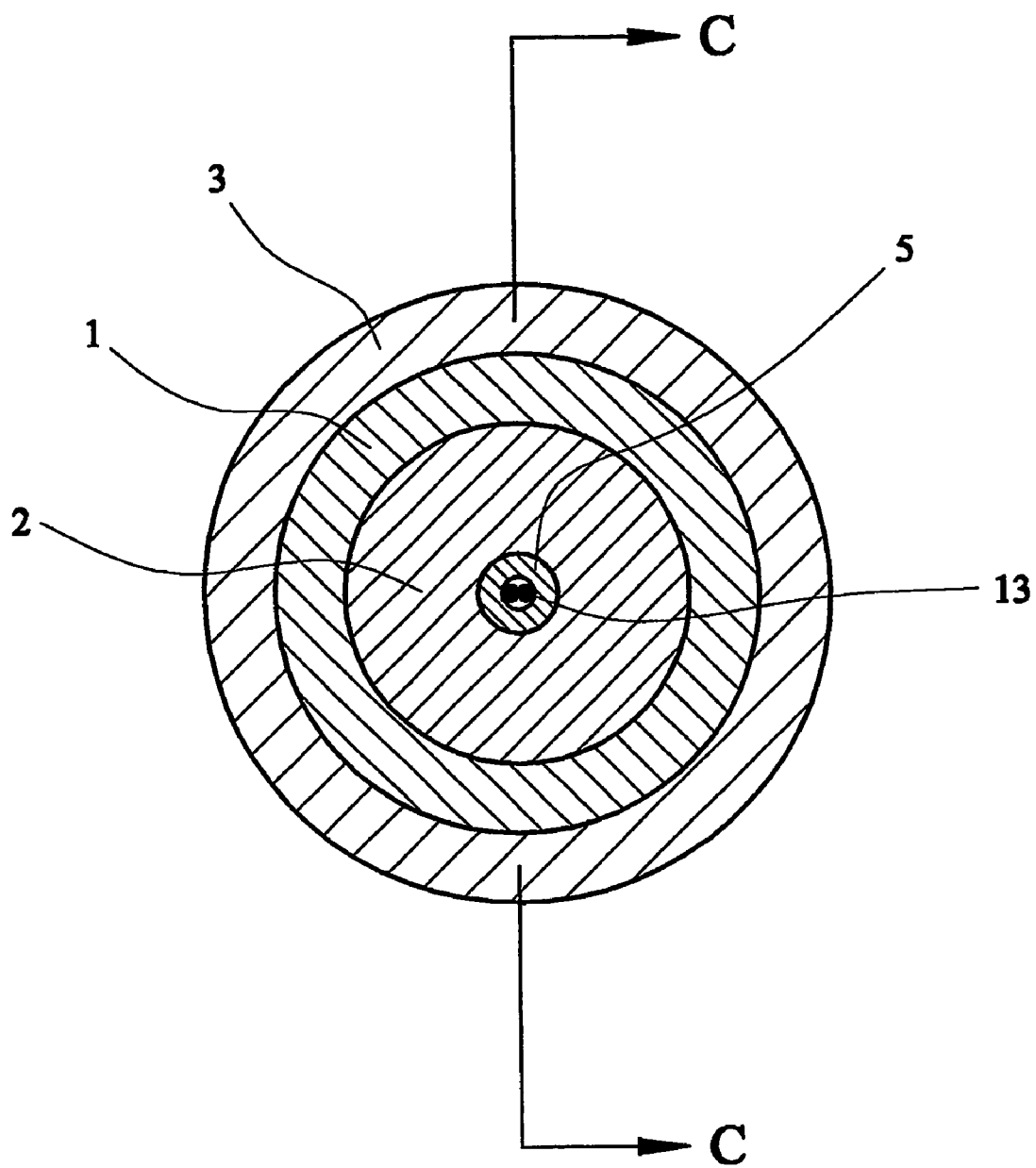
FIG. 4 is a cross sectional view of the assembly on a plane indicated by B—B in FIG. 1.

Referring now to FIGS. 1 to 4 of the drawings, there is shown an antenna assembly for an induction logging tool (for use in drilling operations) and which has been designed to maintain its electrical integrity (and hence the accuracy of the logging tool), despite the adverse environmental factors which prevail in a typical drilling situation.

The antenna assembly is designated generally by reference 20, and has been designed specifically for use with an induction logging tool of the general type disclosed in U.S. Pat. No. 6,100,696 or PCT/GB00/02510.

The assembly has an outer pressure housing 3, and toroidal magnetic cores 6 of MPP (molypermalloy) which are mounted in shock-resistance manner in the housing.

Shock-absorbing mountings 7 mount the cores 6 in the housing 3, and are made of VITON or NITRILE (Trade Mark) elastomer.

Further components of the assembly 20 include a coil former 1 made of cylindrical epoxy glass fibre tube, and core spacers 2 which are thick-walled cylindrical epoxy glass fibre tube. The outer pressure housing 3 also is made of cylindrical epoxy glass fibre tube. A core former 4 is also made of cylindrical glass fibre tube, and reference 5 denotes a super shield made of a ferrous metal core with a copper sheath. The glass fibre tube is preferably of type with low coefficient of thermal expansion, in the axial direction, and capable of withstanding temperatures up to 175° C.

O-rings 8 are made of VITON or NITRILE elastomer, and reference 9 denotes Litz wire which is a high temperature insulated multi-strand wire. 10 is adhesive tape (KAPTON tape), and of polyimide, and 11 is an electrostatic shield manufactured from flexible printed circuit (polyimide and copper). The Kapton tape (polyimide film) restricts unwanted movement or radial thermal expansion of the Litz wire wound around the coil former, maintaining the dimensional stability of the coil and hence its effective aperture and self inductance. 12 is hydraulic oil (Shell Tellus), and 15 and 13 are copper conductors.

As can be seen in FIG. 1, the shock absorbing mountings 7 comprise three different types of mounting blocks, namely an axially short outer sleeve 7a, a longer inner sleeve 7b, and a pair of annular collars 7c arranged one at each end of a stack of axially spaced magnetic cores 6.

Figure 5:
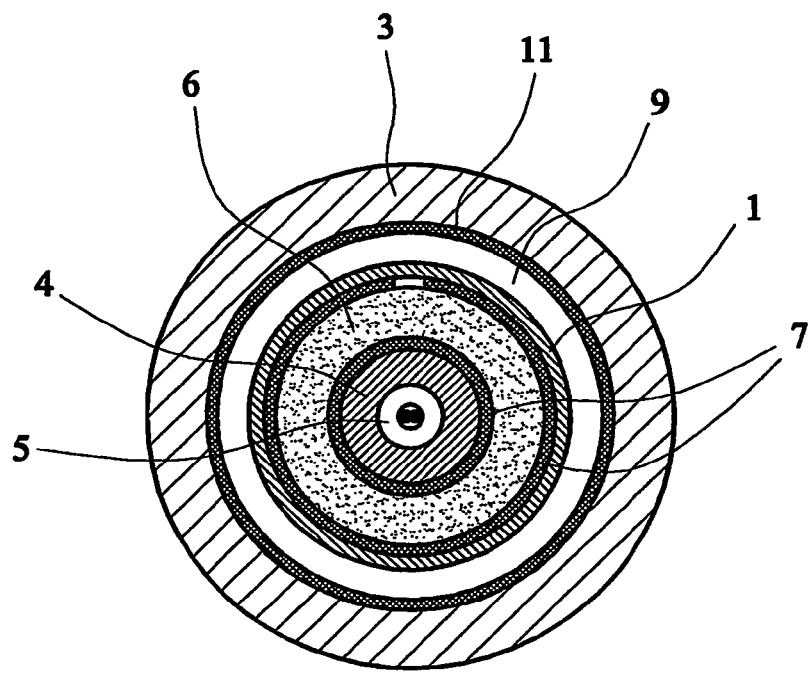
FIG. 5 is a cross sectional view of the assembly on a plane indicated by A—A in FIG. 1, and showing a first arrangement of shock absorbing mountings for magnetic cores of the antenna assembly.
Figure 7:
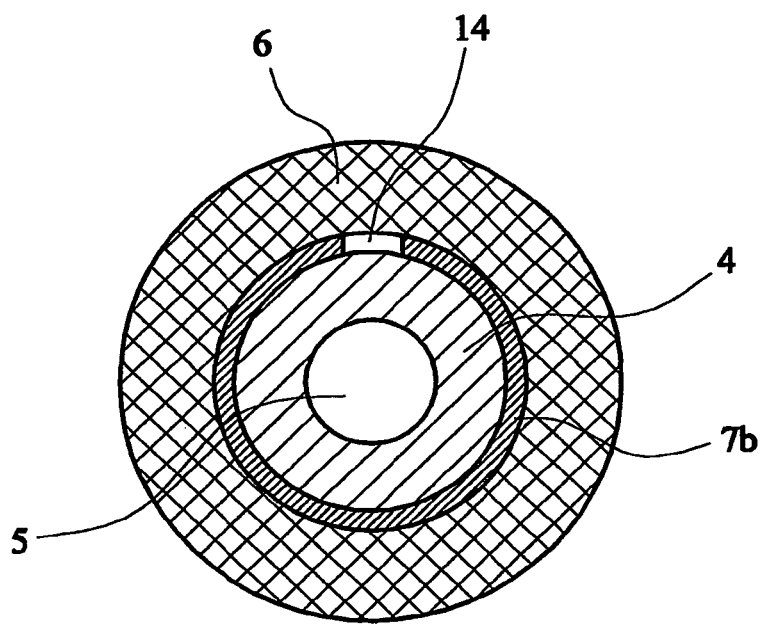

FIGS. 5 and 7 show cross sections of the arrangement of mountings 7 in more detail, and in particular of the inner sleeve 7b on the core former 4 with a narrow axial slot 14 providing a path for hydraulic oil 12.

Figure 6:
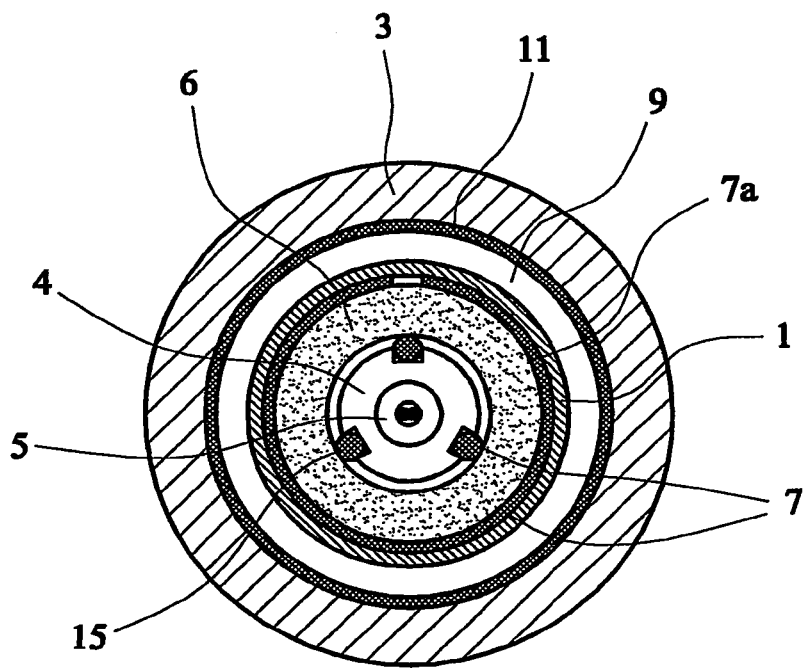
FIG. 6 is a cross sectional view of an alternative arrangement of shock absorbing mountings; and, FIGS. 7 and 8 correspond to FIGS. 5 and 6 respectively, and show, to an enlarged scale, the differences in the internal arrangement of the innermost of the shock absorbing mountings between the radially outer surface of a core former and the radially inner surface of the magnetic cores.
Figure 8:
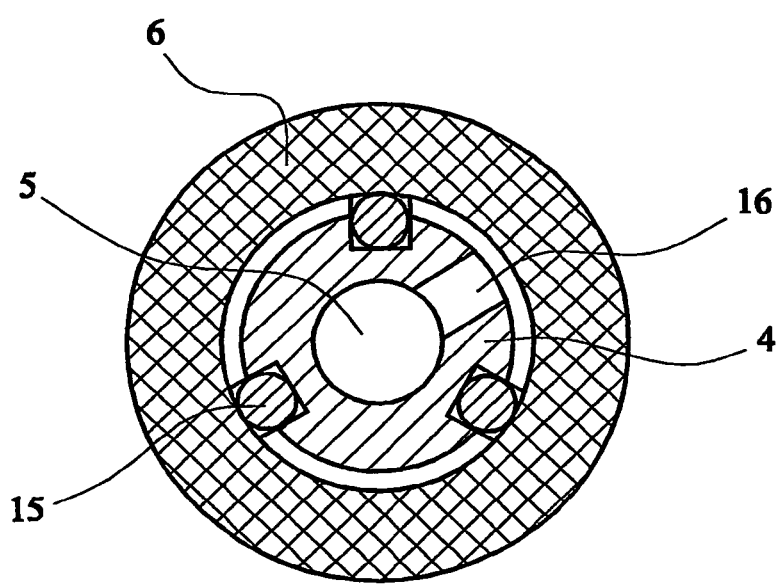

An alternative arrangement of the mountings 7 is shown in FIGS. 6 and 8, in a preferred development of the invention. In particular, the innermost shock absorbing mountings (7b) of the first arrangement (see FIGS. 5 and 7) are modified. The inner sleeve 7b of FIGS. 5 and 7 is a continuous layer of VITON which is wrapped around the core former 4, below the magnetic cores 6, and having a small oil path 14. This is replaced in the arrangement of FIGS. 6 and 8 by three axially extending shock absorbing blocks in the form of three separate dampers 15 which are of circular cross section, and which are located in axial slots machined in the outer surface of the core former 4, and which run the full length of the core assembly. The slots are positioned at 120° apart spacing circumferentially of the core former 4. In addition, three small lateral holes between the internal surface of the core former 4 and the cavity created between the inner surface of the magnetic cores 6 and the outer surface of the core former 4 are drilled to provide hydraulic coupling, one such hole being shown by reference 16 in FIG. 8, to provide an oil path.

This preferred development has the following additional advantages, over and above the first described arrangement of mounting blocks. These advantages are as follows:

1. Thermal expansion of the shock absorbing materials beneath the magnetic cores 6 no longer applies stresses to the magnetic material;

2. Hydraulic balance between the outside and inside surfaces of the magnetic cores 6 can be guaranteed, again minimising stresses applied to the magnetic materials;

3. It is envisaged that lateral damping from shock and vibration will also be considerably improved.

The invention claimed is:

1. An antenna assembly for an induction logging tool for use in a drilling operation, said assembly comprising:
   an outer pressure housing;
   a coil former within the pressure housing;
   magnetic cores mounted in the housing;
   a core carrier within the coil former and the pressure housing, and which carries the magnetic cores; and
   shock-absorbing mountings on the core carrier for the magnetic cores.

2. An antenna assembly according to claim 1, in which the shock-absorbing mountings include a sleeve mounted on the core carrier.

3. An antenna assembly according to claim 1, in which the shock absorbing mountings include an outer sleeve located between the outer surfaces of at least some of the magnetic cores and the inner surface of the pressure housing.

4. An antenna assembly according to claim 1, in which the shock absorbing mountings include annular collars arranged one at each end of a stack of axially spaced magnetic cores.

5. An antenna assembly according to claim 1, in which the core carrier comprises an inner metal core and an outer cylindrical tube.

6. An antenna assembly according to claim 1, in which the magnetic cores are annular cores arranged in an axially spaced stack of cores mounted on the core carrier.

7. An antenna assembly for an induction logging tool for use in a drilling operation, said assembly comprising:
   an outer pressure housing;
   a coil former within the pressure housing;
   magnetic cores mounted in the housing;
   a core carrier within the coil former and the pressure housing, and which carries the magnetic cores; and
   shock-absorbing mountings on the core carrier for the magnetic cores including a number of separate axially extending elongate blocks circumferentially spaced from each other around the outer surfaces of the core carrier and the inner surface of the magnetic cores.

8. An antenna assembly according to claim 7, in which the shock-absorbing mountings include a sleeve mounted on the core carrier.

9. An antenna assembly according to claim 7, in which the shock absorbing mountings include an outer sleeve located between the outer surfaces of at least some of the magnetic cores and the inner surface of the pressure housing.

10. An antenna assembly according to claim 7, in which the shock absorbing mountings include annular collars arranged one at each end of a stack of axially spaced magnetic cores.

11. An antenna assembly according to claim 7, in which the core carrier comprises an inner metal core and an outer cylindrical tube.

12. An antenna assembly according to claim 7, in which the magnetic cores are annular cores arranged in an axially spaced stack of cores mounted on the core carrier.

13. An antenna assembly for an induction logging tool for use in a drilling operation, said assembly comprising:
   an outer pressure housing;
   a coil former within the pressure housing;
   magnetic cores mounted in the housing;
   a core carrier within the coil former and the pressure housing, and which carries the magnetic cores
   shock-absorbing mountings on the core carrier for the magnetic cores; and
   ducts of holes which route hydraulic oil to contact the magnetic cores.

14. An antenna assembly according to claim 13, in which the shock-absorbing mountings include a sleeve mounted on the core carrier.

15. An antenna assembly according to claim 13, in which the shock absorbing mountings include an outer sleeve located between the outer surfaces of at least some of the magnetic cores and the inner surface of the pressure housing.

16. An antenna assembly according to claim 13, in which the shock absorbing mountings include annular collars arranged one at each end of a stack of axially spaced magnetic cores.

17. An antenna assembly according to claim 13, in which the core carrier comprises an inner metal core and an outer cylindrical tube.

18. An antenna assembly according to claim 13, in which the magnetic cores are annular cores arranged in an axially spaced stack of cores mounted on the core carrier.

* * * * *